(No Model.)
F. L. McGAHAN.
FEED WATER REGULATOR.
No. 462,273. Patented Nov. 3, 1891.
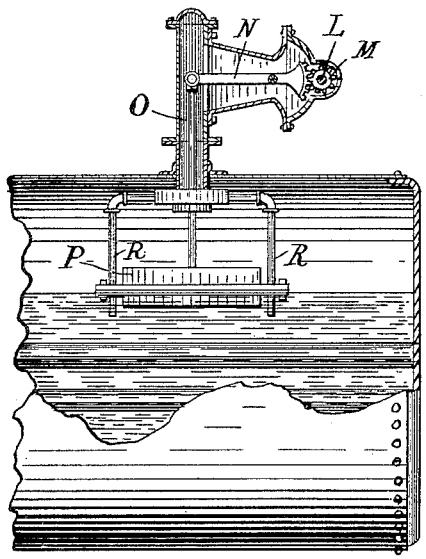
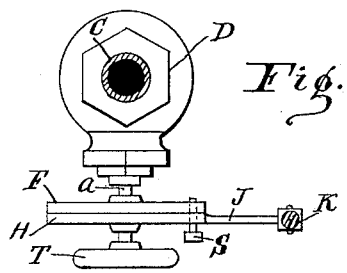
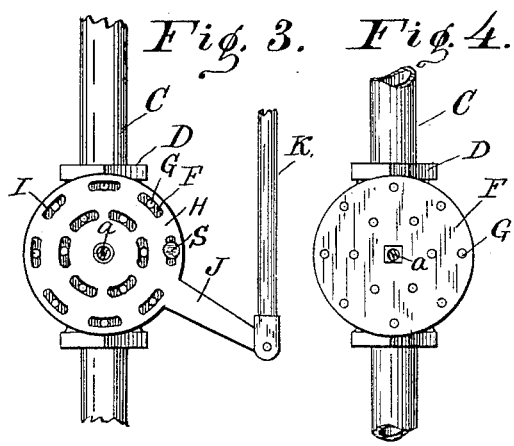
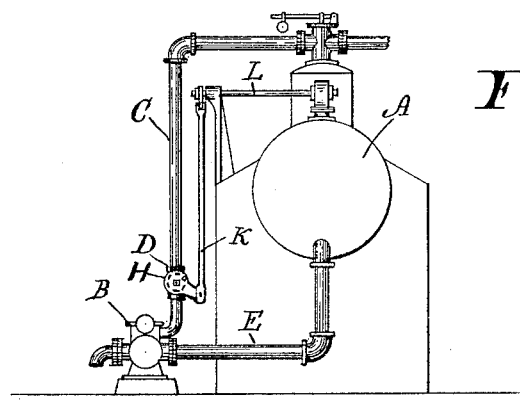
WITNESSES:
A. M. Hood,
V. M. Hood.
INVENTOR
Fred. L. McGahan,
BY
H. P. Hood.
ATTORNEY.

UNITED STATES PATENT OFFICE.

FRED. L. McGAHAN, OF INDIANAPOLIS, INDIANA.

FEED-WATER REGULATOR.

SPECIFICATION forming part of Letters Patent No. 462,273, dated November 3, 1891.

Application filed July 20, 1891. Serial No. 400,066. (No model.)

*To all whom it may concern:*

Be it known that I, FRED. L. McGAHAN, a citizen of the United States, residing at Indianapolis, in the county of Marion and State of Indiana, have invented a new and useful Improvement in Feed-Water Governors for Steam-Boilers, of which the following is a specification.

My invention relates to an improved governor for controlling the feed-water supply for steam-boilers, shown as a part of my pending application Serial No. 378,280.

The object of my improvement is to provide improved means for connecting a float resting upon the surface of the water in the boiler and the throttle-valve of the steam-pump supplying said water, whereby the throttle may be opened to any desired extent and then automatically opened or closed by the rise or fall of the float, all as hereinafter described.

The accompanying drawings illustrate my invention.

Figure 1 represents an elevation showing my improvement applied to a feed-water pump of a boiler. Fig. 2 represents the interior of the boiler and the float mounted therein. Figs. 3 and 4 are elevations, on an enlarged scale, of the means for controlling the throttle-valve of the steam-pump. Fig. 5 is a plan of the valve as shown in Fig. 3.

In the drawings, A indicates the boiler; B, the steam-pump arranged to supply the boiler with water; C, the steam-pipe supplying the pump with steam; D, the throttle-valve in said steam-pipe, and E the water-supply pipe.

Mounted upon the stem $a$ of the throttle-valve is the disk F, having a series of perforations G. Said disk is secured rigidly to the stem of the throttle-valve, so as to turn therewith. Mounted loosely upon the stem of the valve, by the side of the disk F, is a second disk H, having a series of slotted perforations I, which register with the perforations G in the disk F.

Disk H is provided with an operating-lever J, which is connected by means of a rod K, shaft L, pinion M, segment-lever N, and rod O, with a float P, mounted on vertical guides R within the boiler and resting on the surface of the water therein. The arrangement of the disk H is such that when a pin S is inserted in one of the perforations of the disk F, passing through one of the slots I in the disk H, the disk H may be turned or oscillated a short distance without affecting the throttle-valve, but will, on being moved further in either direction, engage the pin and thus turn the disk F and the stem of the throttle-valve, and thus increase or decrease the opening of the valve, as the case may be. By this mechanism when pin S is removed the throttle-valve may be opened any desired distance by means of a hand-wheel T and the pump given any desired speed. When the boiler has been filled with water to the desired height, pin S is inserted in one of the perforations G, and disk H being oscillated by the movement of the float P, the valve is not affected by the rise or fall of the water in the boiler within certain narrow limits; but when those limits are exceeded the movement of the float is communicated to the valve and the speed of the pump is increased by the falling of the water-level and decreased by its rising.

I claim as my invention—

In an apparatus for supplying boilers with water, the combination of the boiler, the steam-pump arranged to supply feed-water to said boiler, the steam-pipe connecting the pump with the boiler, the throttle-valve arranged in said pipe, the disk rigidly secured to the stem of said throttle-valve and provided with one or more pin-holes, the disk loosely mounted on said valve-stem and provided with one or more slots, which register with said pin-holes, the pin projecting from the fixed disk through the movable disk, the float mounted in the boiler, and intermediate connecting mechanism connecting said float and movable disk, all arranged to co-operate substantially as set forth, whereby the amount of steam supplied to the pump is controlled by a material rise or fall of the water in the boiler, but is unaffected by slight variations in the water-level, substantially as set forth.

FRED. L. McGAHAN.

Witnesses:
H. P. HOOD,
A. M. HOOD.